(12) United States Patent
Sasaki et al.

(10) Patent No.: US 7,619,386 B2
(45) Date of Patent: Nov. 17, 2009

(54) BATTERY PACK, CHARGING CONTROL METHOD, AND APPLICATION DEVICE

(75) Inventors: Taichi Sasaki, Fukushima (JP); Masahiko Hayakawa, Fukushima (JP); Dai Sasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/290,929

(22) Filed: Nov. 30, 2005

(65) Prior Publication Data

US 2006/0119315 A1 Jun. 8, 2006

(30) Foreign Application Priority Data

Dec. 2, 2004 (JP) .......................... P2004-349748

(51) Int. Cl.
*H02J 7/00* (2006.01)

(52) U.S. Cl. .................. 320/106; 320/112; 340/636.1

(58) Field of Classification Search ................ 320/106, 320/110, 112; 340/636.1
See application file for complete search history.

(56) References Cited

U.S. PATENT DOCUMENTS

| 5,350,993 A | 9/1994 | Toya et al. |
| 5,608,306 A * | 3/1997 | Rybeck et al. ............... 320/106 |
| 5,717,307 A * | 2/1998 | Barkat et al. ............. 340/636.1 |
| 6,429,622 B1 | 8/2002 | Svensson |
| 2003/0102842 A1 | 6/2003 | Tamai et al. |
| 2004/0181695 A1* | 9/2004 | Walker ........................ 713/202 |

FOREIGN PATENT DOCUMENTS

| GB | 2 396 261 | 6/2004 |
| JP | 2004-147408 | 5/2004 |
| JP | 2006128911 A * | 5/2006 |
| WO | WO 99/00863 | 1/1999 |

* cited by examiner

*Primary Examiner*—Edward Tso
*Assistant Examiner*—Aaron Piggush
(74) *Attorney, Agent, or Firm*—K&L Gates LLP (57) ABSTRACT

A battery pack having a secondary battery and a circuit that controls charging and discharging of the secondary battery is provided. The battery pack has a computer and a charging control section. The computer communicates with another computer disposed in a charging device and authenticates the charging device. The charging control section, controlled by the computer, supplies a charging current to the secondary battery when the charging device has been successfully authenticated and shuts off the charging current when the charging device has not been successfully authenticated.

9 Claims, 4 Drawing Sheets

BATTERY PACK, CHARGING CONTROL METHOD, AND APPLICATION DEVICE

CROSS REFERENCES TO RELATED APPLICATIONS

The present application claims priority to Japanese Patent Application JP 2004-349748 filed in the Japanese Patent Office on Dec. 2, 2004, the entire contents of which is being incorporated herein by reference.

BACKGROUND

The present invention relates to a battery pack and a charging control method that allow the battery pack to authenticate a charging device and prevent the charging device from charging the battery pack when the charging device is not an unauthorized charging device.

Since a secondary battery, for example a lithium ion battery, has features of small size, light weight, high energy density, high output, and so forth, it has been widely used for power supplies of application devices such as a digital camera, a cellular phone, a portable personal computer, and so forth. Such a lithium ion battery needs to be charged by a charging device manufactured by an authorized manufacturer to secure safe use of the battery and prevent the battery life from decreasing. For example, an unauthorized charging device may not satisfy necessary specifications. If the battery is charged by such an unauthorized charging device, the battery may be overcharged.

The following patent document 1 describes a related art reference of which a battery pack and an application device authenticate each other to prevent an authorized battery pack from being used.

[Patent Document 1] Japanese Patent Laid-Open Publication No. 2004-147408.

In the related art reference described in the patent document 1, a microcomputer disposed in a camcorder as an application device and a microcomputer disposed in a battery pack authenticate each other. According to the authenticated results, a power supply line of the camcorder is turned on or off. In the related art reference described in the patent document 1, the camcorder is prohibited from using a forged battery pack that unlikely satisfies the specifications of the camcorder. In other words, the related art reference described in the patent document 1 does not intend to prevent an unauthorized charging device from charging an authorized battery pack.

SUMMARY

In view of the foregoing, it would be desirable to provide a battery pack, a charging control method, and an application device that allow the battery pack to be prevented from being charged by an unauthorized charging device.

According to an embodiment of the present invention, there is provided a battery pack having a secondary battery and a circuit that controls charging and discharging of the secondary battery. The battery pack has a computer and a charging control section. The computer communicates with another computer disposed in a charging device and authenticates the charging device. The charging control section, controlled by the computer, supplies a charging current to the secondary battery when the charging device has been successfully authenticated and shuts off the charging current when the charging device has not been successfully authenticated.

According to an embodiment of the present invention, there is provided a charging control method of a battery pack having a secondary battery and a circuit that controls charging and discharging of the secondary battery. The charging device is authenticated through a communication. A charging current is supplied to the secondary battery when the charging device has been successfully authenticated and the charging current is shut off when the charging device has not been successfully authenticated.

According to an embodiment of the present invention, there is provided an application device to which a battery pack is attached as a power supply. The application device has a second computer. The second computer communicates with a first computer disposed in the battery pack and authenticates the battery pack. When the battery pack is charged with a power of an AC adaptor connected to the application device, the first computer controls charging of the battery pack so that when the battery pack has been successfully authenticated, the charging current is supplied to a secondary battery and when the battery pack has not been successfully authenticated, the charging current is shut off.

According to an embodiment of the present invention, since the battery pack is prevented from being charged by an unauthorized charging device, the safety of the battery pack can be improved. In addition, the deterioration of the performance of the battery pack, such as a decrease of the battery life, due to the use of an unauthorized charging device can be prevented. Thus, the reliability of the battery pack can be improved. In addition, unauthorized charging devices that are dangerous for the battery pack can be kept out from the market.

Additional features and advantages are described herein, and will be apparent from, the following Detailed Description and the figures.

DETAILED DESCRIPTION

Figure 1:
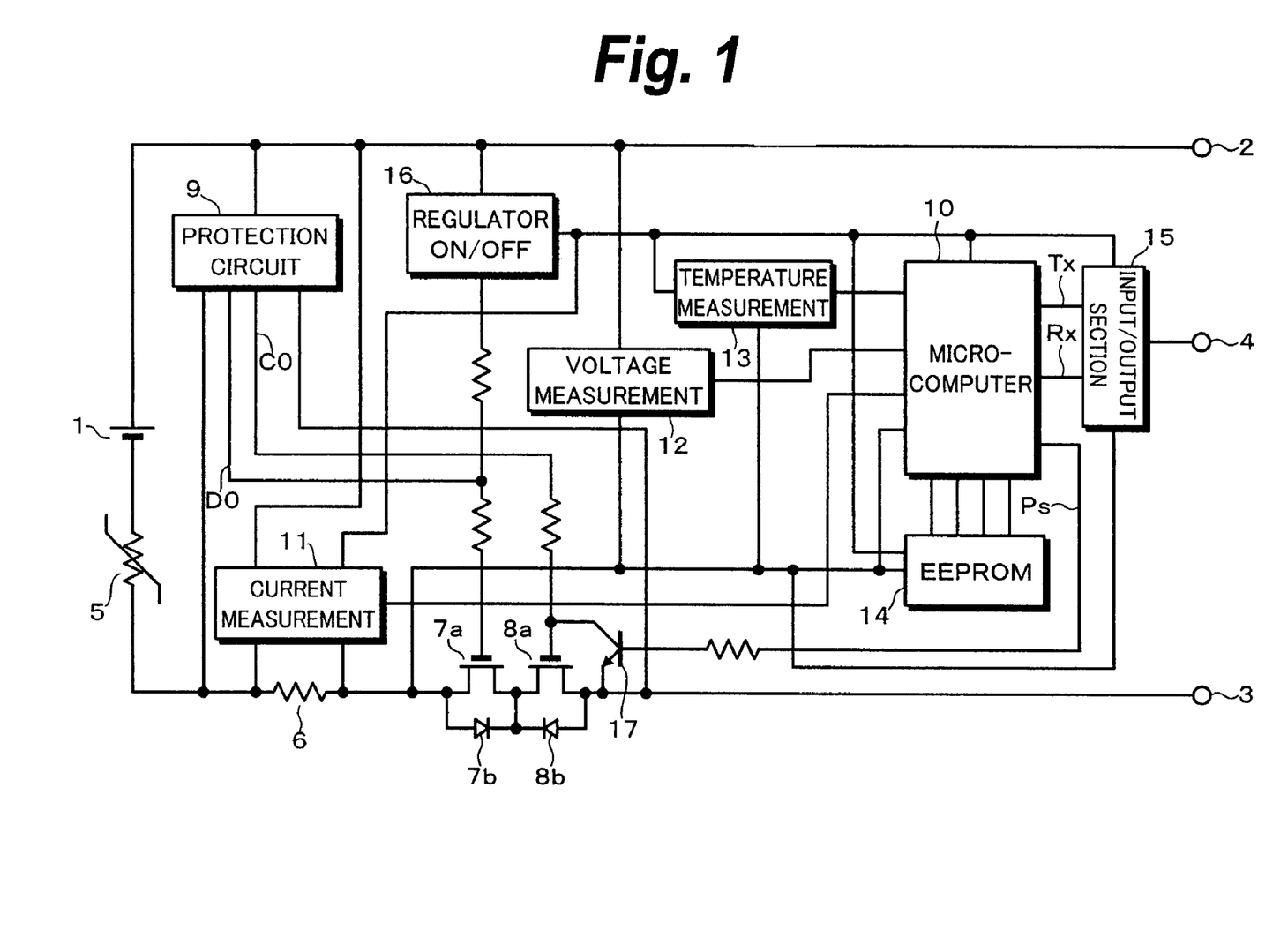
FIG. 1 is a schematic diagram showing circuitry of a battery pack according to an embodiment of the present invention.

Next, with reference to the accompanying drawings, embodiments of the present invention will be described. FIG. 1 shows a battery pack according to an embodiment of the present invention. In FIG. 1, reference numeral 1 represents a secondary battery, for example a lithium ion battery. The battery pack has a plus (+) terminal 2, a minus (−) terminal 3, and a communication terminal 4.

A positive electrode of the secondary battery 1 is connected to the plus (+) terminal 2. A negative electrode of the secondary battery 1 is connected to the minus (−) terminal 3 through a current restriction device 5, a current detection resistor 6, a drain and a source of a discharging control field effect transistor (FET) 7a, and a drain and a source of a charging control FET 8a. The current restriction device 5 is for example a positive temperature coefficient (PTC) device. When temperature rises, the resistance of the current restriction device 5 increases and restricts a current that flows. Parasitic diodes 7b and 8b are disposed between the drain and the source of the FET 7a and between the drain and the source of the FET 8a, respectively.

Control signals D0 and C0 are supplied from a protection circuit 9 to the gates of the discharging control FET 7a and the charging control FET 8a, respectively. In the regular charging and discharging operations, the signal levels of the control signals D0 and C0 are high, causing the FETs 7a and 7b to be turned on. The protection circuit 9 has three functions that are an overcharging protection function, an overdischarging protection function, and an overcurrent protection function. Next, these protection functions will be described in brief.

First, the overcharging protection function will be described. When the secondary battery 1 is charged, the battery voltage continues to rise after the secondary battery 1 is fully charged. When the secondary battery 1 is overcharged, it may become dangerous. Thus, the secondary battery 1 needs to be charged with a constant current at a constant voltage. The charging control voltage needs to be the rating voltage or lower of the battery (for example, 4.2 V). However, if the charging device malfunctions or an unauthorized charging device is used, the secondary battery 1 may be overcharged. When the secondary battery 1 is overcharged and the battery voltage becomes a predetermined value or higher, the signal level of the output C0 of the protection circuit 9 is changed from high level to low level, causing the charging control FET 8a to be turned off and the charging current to be shut off. This function is the overcharging protection function. When the charging control FET 8a is turned off, the secondary battery 1 can be only discharged through the discharging control FET 7a and the parasitic diode 8b.

Next, the over discharging protection function will be described. When the secondary battery 1 is discharged and the battery voltage drops to a rating discharge stop voltage or lower, for example, 2 V to 1.5 V, the secondary battery 1 may malfunction. When the battery voltage drops to a predetermined value or lower, the signal level of the output D0 of the protection circuit 9 is changed from high level to low level, causing the discharging control FET 7a to be turned off and the discharging current to be shut off. This function is the over discharging protection function. When the discharging control FET 7a is turned off, the secondary battery 1 can be only charged through the charging control FET 8a and the parasitic diode 7b.

Next, the overcurrent protection function will be described. When the plus (+) terminal and the minus (−) terminal of the secondary battery 1 are short-circuited, a large current flows in the secondary battery 1 and may cause it to abnormally heat. If a discharging current that flows exceeds a predetermined value, the signal level of the output D0 of the protection circuit 9 is changed from high level to low level, causing the discharging control FET 7a to be turned off and the discharging current to be shut off. This function is the overcurrent protection function.

Reference numeral 10 represents a microcomputer disposed in the battery pack. A current measurement section 11 detects a current that flows in the current detection resistor 6. A voltage measurement section 12 measures a battery voltage. A temperature measurement section 13 measures the temperature of the secondary battery 1 with a temperature detection device such as a thermistor. The measured values are input to the microcomputer 10.

An electrically erasable and programmable read only memory (EEPROM) 14, which is a nonvolatile memory, is connected to the microcomputer 10. Data input lines, data output lines, clock supply lines, and chip select lines are connected between the microcomputer 10 and the EEPROM 14. The microcomputer 10 calculates remaining capacity information with the current measurement value, the voltage measurement value, and the temperature measurement value. The EEPROM 14 stores the measured values, data necessary to obtain the remaining capacity, for example a table representing the relationship of the battery voltage and remaining power, obtained remaining capacity information, and so forth. The nonvolatile memory may be a random access memory (RAM) that has a backup power supply besides the EEPROM.

The remaining capacity of the secondary battery may be detected by for example the voltage method of which the remaining capacity of the secondary battery is detected by measuring the battery voltage and the cumulation method of which the remaining capacity of the secondary battery is obtained by measuring the voltage and current of the secondary battery and multiplying them.

When the remaining capacity of the secondary battery is detected by the voltage method, since the terminal voltage of the battery cell is measured. The remaining capacity is calculated according to the correlation of the voltage and battery capacity (remaining capacity ratio) of the secondary battery. Thus, when the battery voltage of the lithium ion battery is 4.2 V/cell, it is determined to be fully charged. When the battery voltage is 2.4 V/cell, it is determined to be overcharged. As a result, the remaining capacity of the secondary battery can be easily measured.

The cumulation method of detecting the remaining capacity of the secondary battery can be categorized as the current cumulation method of which the current of the secondary battery is measured and cumulated at intervals of a predetermined period and the power cumulation method of which the voltage and current of the secondary battery are measured, they are multiplied, the power is obtained, and the power is cumulated at intervals of a predetermined period. In any method, the discharging current or discharging power of the secondary battery is obtained. According to the ratio of the discharging current or discharging power and the usable current or usable power of the secondary battery, the remaining capacity of the secondary battery is obtained. Thus, the remaining capacity of the secondary battery can be stably obtained without influence of fluctuation of the battery voltage.

When the battery capacity is detected by using the cumulation method and the voltage method together, the accuracy of the obtained battery capacity can be improved. When the current of the secondary battery is lower than a preset value, the voltage method may be used. In contrast, when the current of the secondary battery is higher than the preset value, the current cumulation method may be used. When the battery capacity is measured by selectively using these methods, the calculation accuracy of the battery capacity can be improved. Another detection method of which the remaining capacity ratios detected by the cumulation method and the voltage method are weighted according to the remaining capacity ratio of the secondary battery, the results are added, and a final remaining capacity ratio is detected has been proposed. According to this embodiment, any of these methods can be used.

As the remaining capacity information, specifically, remaining capacity (mAh), remaining capacity ratio (%), and remaining usable time (minute) are calculated. The remaining capacity information is transmitted from the microcomputer 10 to a microcomputer of an application device to which the battery pack is connected. The application device side displays the received remaining capacity information on a display section such as a liquid crystal display.

According to the embodiment of the present invention, the communication terminal 4 is used to allow the microcomputers to communicate with each other. A transmission signal and a reception signal that have been time-division multiplexed are transmitted through one signal line connected to the communication terminal 4. An input/output section 15 is disposed between the microcomputer 10 and the communication terminal 4. The input/output section 15 for example separates a transmission signal Tx and a reception signal Rx and adjusts the levels of these signals. Instead, independent transmission and reception terminals may be disposed.

In the addition, the battery pack has a regulator 16 that generates a predetermined regulated voltage of for example 2.5 V with the voltage of the secondary battery 1. The voltage generated by the regulator 16 is supplied as a power supply voltage to the microcomputer 10, the current measurement section 11, the temperature measurement section 13, the EEPROM 14, and the input/output section 15.

The control signal D0 supplied from the protection circuit 9 to the gate of the discharging control FET 7a is supplied as an on/off control signal to the regulator 16. In other words, a possibility of over discharging of the battery pack is detected. The control signal that turns off the discharging control FET 7a turns off the regulator 16. When the regulator 16 is turned off, the output voltage of the regulator 16 becomes 0, causing the circuitry such as the microcomputer 10 that uses the output voltage of the regulator 16 as the power supply voltage to stop. The circuitry of the battery pack prevents the secondary battery 1 from being over discharged.

According to an embodiment of the present invention, a charging shutoff transistor 17 is disposed. A collector of the charging shutoff transistor 17 and a gate of the charging control FET 8b are connected. An emitter of the charging shutoff transistor 17 and a source of the FET 8b are connected. A charging shutoff signal Ps is supplied to a base of the charging shutoff transistor 17 from the microcomputer 10.

The microcomputer 10 and the microcomputer of the charging device mutually authenticate each other. According to the authenticated results, the microcomputer 10 generates the charging shutoff signal Ps. When the microcomputer 10 has not successfully authenticated the microcomputer of the charging device, the charging shutoff signal Ps turns on the charging shutoff transistor 17, causing the gate and the source of the charging control FET 8a to be short-circuited. As a result, the charging control FET 8a is turned off, causing the charging current to shut off.

Figure 2A:
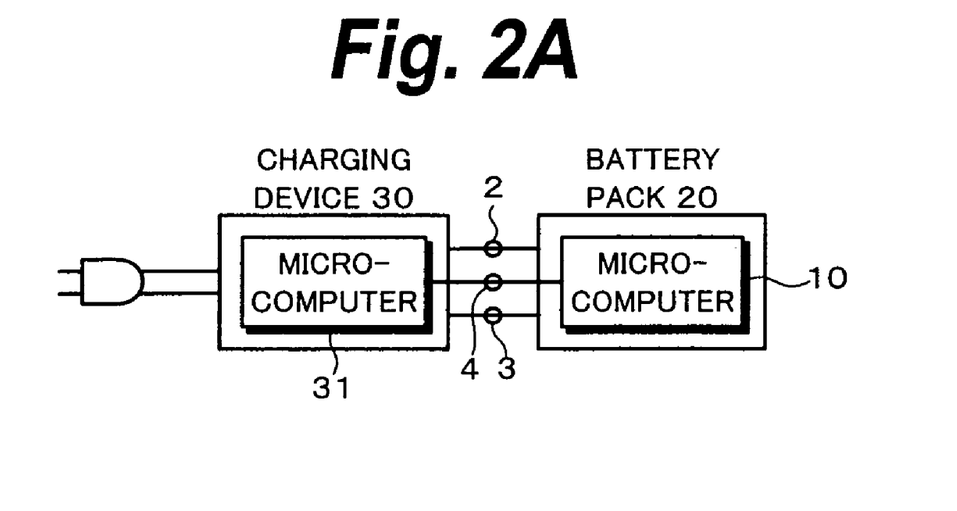
FIG. 2A and FIG. 2B are block diagrams showing an authentication method of structures of a battery pack and a charging device.

Next, with reference to FIG. 2A and FIG. 2B, an example of a connection of the battery pack and the charging device according to an embodiment of the present invention will be described. FIG. 2A shows an example of the structure of which a battery pack 20 is connected to a charging device 30 that rectifies a commercial power and generates a charging power. In FIG. 2A, the charging device 30 has a rectification circuit and a charging circuit (not shown). The battery pack 20 has the same structure as that shown in FIG. 1. In this case, the charging device 30 charges a secondary battery of the battery pack 20. In addition, a microcomputer 31 of the charging device 30 communicates with the microcomputer 10 of the battery pack 20 to mutually authenticate each other.

Figure 2B:
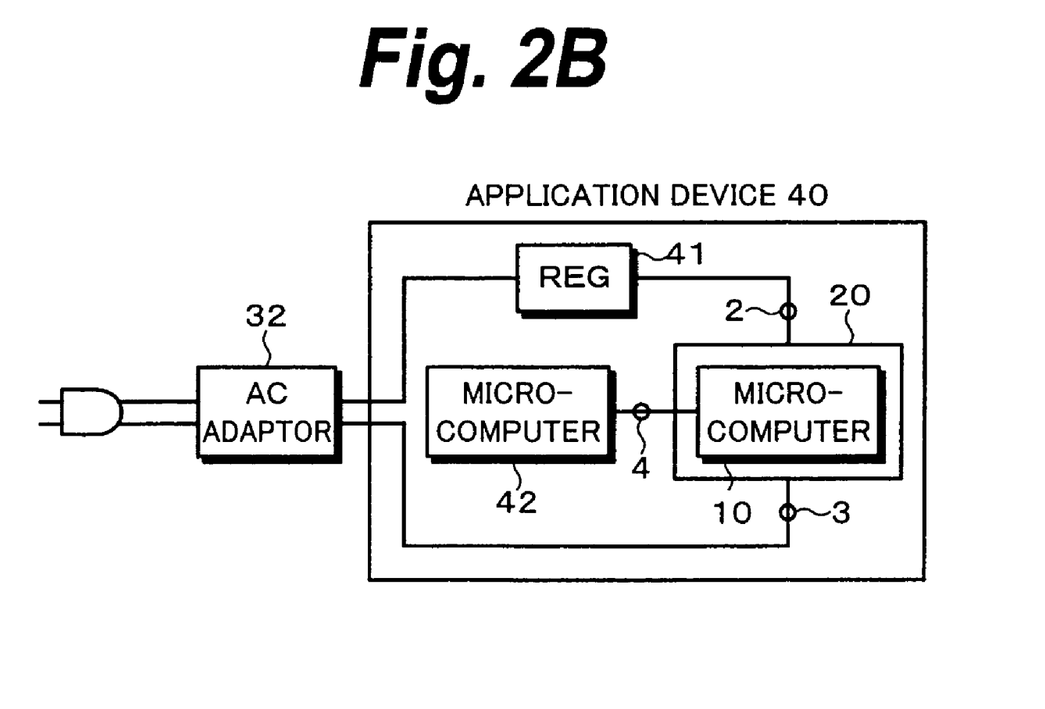

In FIG. 2B, the battery pack 20 is attached to an application device 40. The secondary battery of the battery pack 20 is charged by an AC adaptor 32. In the structure shown in FIG. 2B, the application device 40 and the AC adaptor 32 compose a charging device. The AC adaptor 32 rectifies the commercial power and supplies the rectified power to the application device 40. A regulator 41 disposed in the application device 40 generates a charging power for the secondary battery of the battery pack 20. In this structure, the microcomputer 10 of the battery pack 20 communicates with a microcomputer 42 of the application device 40 to mutually authenticate each other. As a modification of the structure shown in FIG. 2A, the AC adaptor 32 may be connected to a cradle and the AC adaptor 32 may charge the secondary battery of the battery pack 20 of the application device 40 placed in the cradle. In addition, as shown in FIG. 2A, the battery pack 20 charged by the charging device 30 may be attached to the application device 40.

The microcomputer 10 of the battery pack 20 and the microcomputer 31 of the charging device 30 or the microcomputer 42 of the application device 40 are mutually authenticated according to for example the challenge and response system. When the battery pack 20 is attached to the charging device 30 or the application device 40, they are mutually authenticated.

The microcomputer 31 detects whether the battery pack 20 has been attached to the charging device 30 or the application device 40 by reading the content of the EEPROM 14 of the battery pack 20. When predetermined data are returned from the EEPROM 14 in a predetermined time period, the microcomputer 31 determines that the battery pack 20 has been attached. When the predetermined data are not returned from the EEPROM 14 in the predetermined time period, the microcomputer 31 determines that the battery pack 20 have not been attached. Instead, the microcomputer 31 may detect whether the battery pack 20 has been attached detecting a physical connection.

In the challenge and response system, secret information is shared by the charging device (microcomputer 31 or 42; this applies to the following description) and the battery pack (microcomputer 10; this applies to the following description). First, challenge data are transmitted from the charging device to the battery pack. The challenge data are temporary data that are random numbers.

When the battery pack has received the challenge data from the charging device, the battery pack generates response data with own secret information and the challenge data and returns the response data to the charging device. The charging device side performs the same generation process and compares the generated data with the response data. When they match, the charging device determines that the battery pack know the secret information. In other words, the charging device determines that the attached battery pack be an authorized battery pack. Otherwise, the charging device does not successfully authenticate the battery pack and determines that the battery pack is an unauthorized battery pack. The charging device stores the authenticated result.

Next, the authenticating side is changed from the charging device to the battery pack. The authenticated side is changed from the battery pack to the charging device. The charging device generates response data with challenge data received from the battery pack and own secret information and returns response data to the battery pack. The battery pack side generates data in the same generation process and compares the generated data with the received response data. When they match, the battery pack side successfully authenticates the charging device and stores the determined result. In this case, the battery pack determines whether the charging device be an authenticated charging device.

The authenticated result of the battery pack is returned to the charging device. When the two authenticated results are successful, the charging device determines that the mutual authentication has been successfully performed. The charging device stores the mutually authenticated results. When the application device as a charging device has not been successfully authenticated, the application device is incapable of using the battery pack. The battery pack on the authenticating side stores the authenticated result of the charging device on the authenticated side. As will be described above, when the charging device has not been successfully authenticated, it is prohibited from charging the battery pack. Since the battery pack does not authenticate an unauthorized charging device, only an authorized charging device can charge the battery pack. According to an embodiment of the present invention, since charging is controlled according to authenticated results, the battery pack needs to authenticate the charging device. However, it is not necessary to mutually authenticate the battery pack and the charging device. The foregoing authentication method according to the challenge response system is just an example. In other words, another authentication method may be used.

Figure 3:
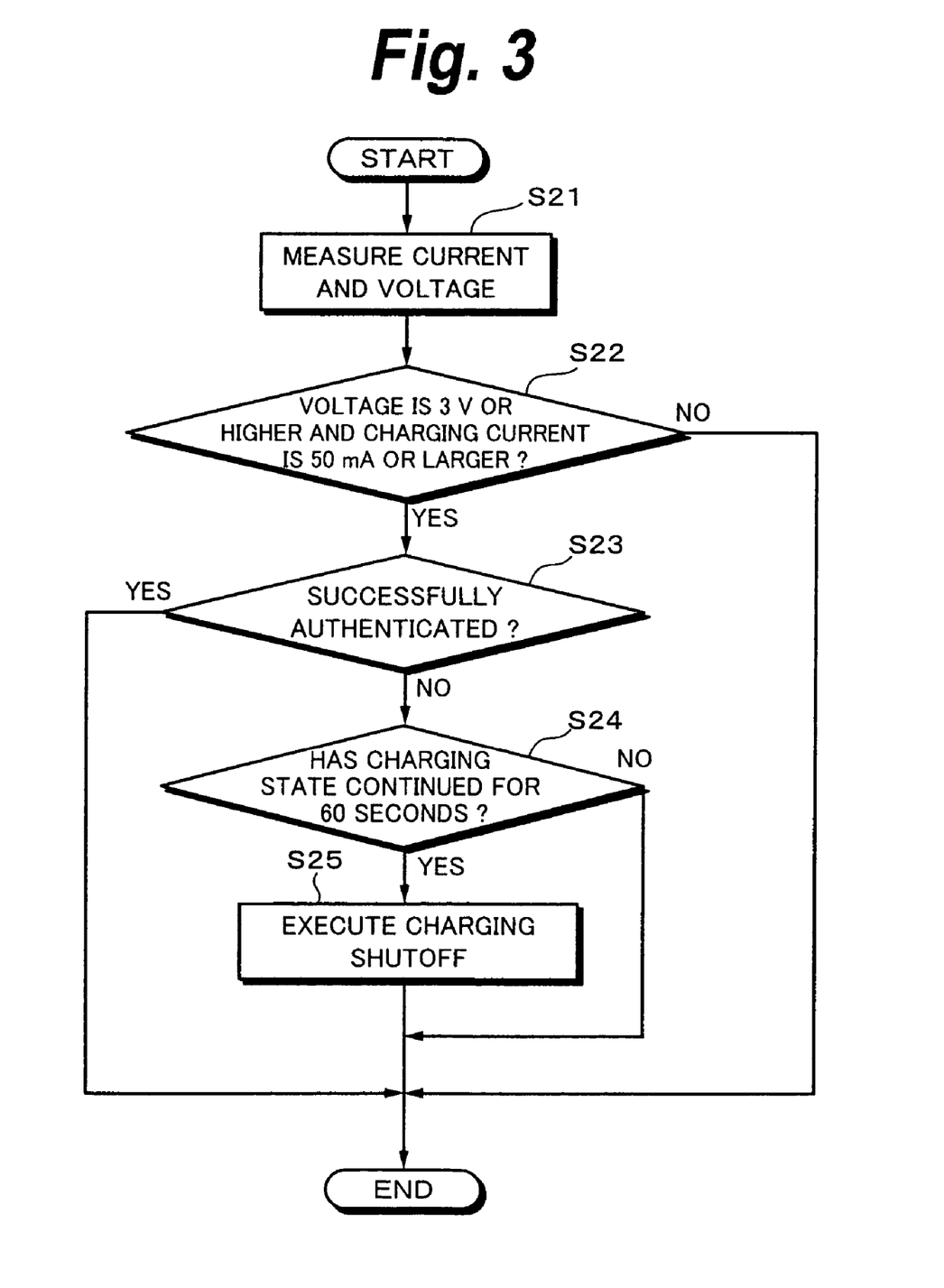
FIG. 3 is a flow chart describing a charging control method performed under the control of a microcomputer of the battery pack.

Next, with reference to a flow chart shown in FIG. 3, a process of a charging control method according to an embodiment of the present invention will be described. The charging control process is performed under the control of the microcomputer 10 of the battery pack. The process of the flow chart shown in FIG. 3 is repeated at intervals of a predetermined time period, for example 1 second. When the battery pack is attached to the charging device (application device; this applies to the following description), the battery pack is charged.

At step S21, the current measurement section 11 and the voltage measurement section 12 measure the current and voltage of the battery pack. At step S22, it is determined whether the voltage is a predetermined value or higher, for example 3 V, and the charging current is a predetermined value or larger, for example 50 mA according to the measured results. To prevent the battery pack from being over discharged, it is determined whether the battery voltage is a predetermined value or higher. The charging current is detected to determine whether the battery pack is being charged. When the determined result at step S22 is No, the process is completed.

When the determined result at step S22 is Yes, the flow advances to step S23. At step S23, it is determined whether the charging device has been successfully authenticated. The authentication process is performed when the determined result at step S22 is Yes. The authentication process may be performed immediately after the battery pack is attached to the charging device.

When the charging device has been successfully authenticated, the charging shutoff operation is not performed. When the charging device has not been successfully authenticated, the flow advances to step S24. At step S24, it is determined whether the charging state has continued for a predetermined time period, for example 60 seconds. This waiting time assures that the authentication operation is securely performed. When 60 seconds has not elapsed, the process is completed. When the determined result represents that 60 seconds has elapsed, the flow advances to step S25. At step S25, the charging shutoff operation is executed.

Next, the charging shutoff operation will be described. First, the microcomputer 10 sets the charging shutoff signal Ps to high level, causing the charging shutoff transistor 17 to be turned off, causing the charging control FET 8a to be turned off. As a result, the charging current is shut off.

The protection circuit 9 detects the voltage of the output terminal 3. When the charging control FET 8a is forcibly turned off, the protection circuit 9 performs an operation similar to the overcurrent protection operation, causing the signal level of the output signal D0 of the protection circuit 9 to be changed from high level to low level. When the signal level of the output signal D0 becomes low level, the regulator 16 stops and the output voltage thereof becomes 0. As a result, the microcomputer 10 that uses an output of the regulator 16 as a power supply is reset, causing the signal level of the charging shutoff signal Ps to be changed from high level to low level.

When the battery pack for which the charging shutoff operation has been performed is detached from the charging device, the charging shutoff state is cancelled. When the battery pack is detached from the charging device, the protection circuit 9 detects a high impedance state between the plus and minus terminals 2 and 3, causing the signal level of the output signal D0 of the protection circuit 9 to be changed from low level to high level. As a result, the regulator 16 is turned on, generating an output voltage. The microcomputer 10 that uses the output voltage of the regulator 16 as a power supply is restored from the reset state to the normal state of which both the FETs 7a and 8a are turned on.

Figure 4A:
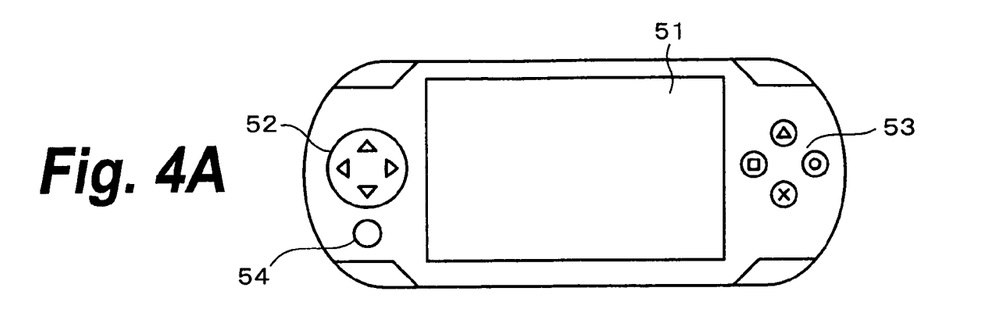
FIG. 4A, FIG. 4B, FIG. 4C, and FIG. 4D are schematic diagrams describing an example of a portable gaming device according to an embodiment of the present invention.

An embodiment of the present invention can be applied to various application devices. Next, with reference to FIG. 4A, FIG. 4B, FIG. 4C, and FIG. 4D, the case that the application device is a portable gaming device will be described. FIG. 4A is a front view showing the portable gaming device. Disposed at a center portion of the portable gaming device is a wide liquid crystal display section 51. Disposed on the left and right of the wide liquid crystal display section 51 are operation keys 52 and 53. The user can enjoy a game by operating the operation keys 52 and 53 while watching the liquid crystal display section 51. As another operation key, an analog pad 54 is also disposed.

Figure 4B:
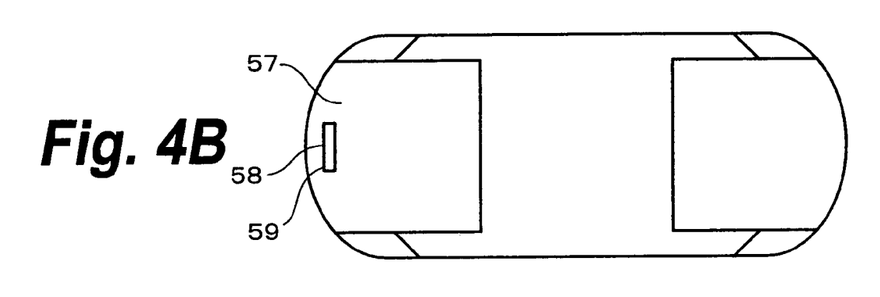
Figure 4C:
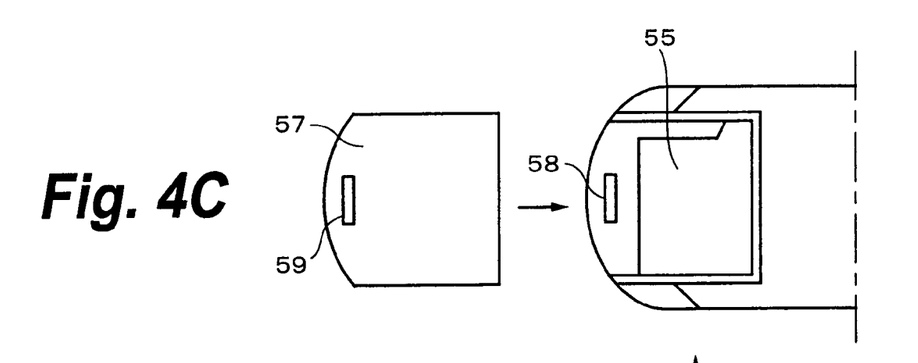

FIG. 4B is a rear view showing the portable gaming device. As shown in FIG. 4C, a battery pack housing section 55 is disposed in the rear of the portable gaming device. A battery pack 56 is accommodated in the housing section 55. A battery lid 57 slidably covers the housing section 55. A protrusion 58 that protrudes from the main body of the portable gaming device is inserted into a hole 59 formed in the battery lid 57 so that the battery lid 57 is locked and closed.

Figure 4D:
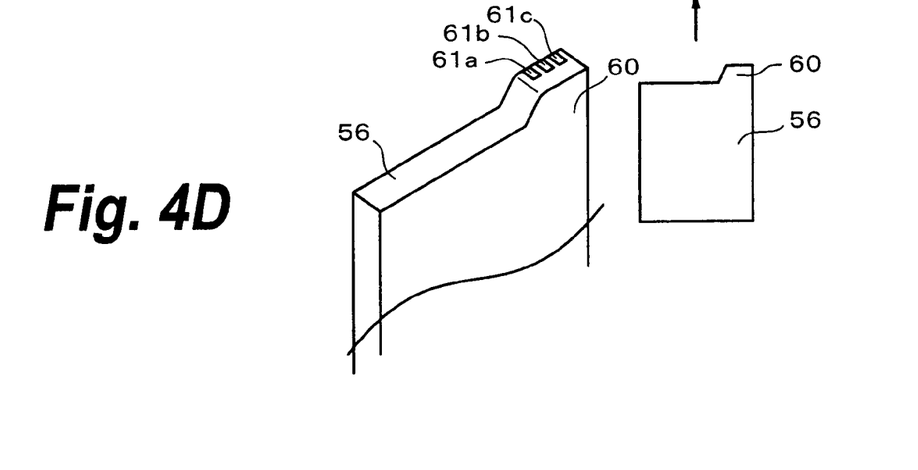

As shown in FIG. 4D, connection terminals 61a, 61b, and 61c are disposed on an edge portion 60 of the protrusion portion 60 of the battery pack 56. The connection terminals 61a, 61b, and 61c correspond to the terminals 2, 3, and 4 shown in FIG. 1, respectively.

The portable gaming device shown in FIG. 4A to FIG. 4D have various functions such as an optical disc recording/reproducing function, a wireless LAN connection function, a USB interface function, and a memory card interface function. In addition, the portable gaming device has keys other than those shown in FIG. 4A, connection portions, and so forth. Since these functions do not relate to an embodiment of the present invention, their description will be omitted. Of course, an embodiment of the present invention can be applied to various application devices such as a digital video camera, a digital camera, a personal digital assistant (PDA), and a cellular phone.

An embodiment of the present invention may be applied to a battery pack having a plurality of secondary batteries and a battery pack having a structure of which a charging control FET and a discharging control FET are connected to the positive electrode.

It should be understood that various changes and modifications to the presently preferred embodiments described herein will be apparent to those skilled in the art. Such changes and modifications can be made without departing from the spirit and scope of the present subject matter and The invention is claimed as follows:

1. A battery pack having a secondary battery and a circuit that controls charging and discharging of the secondary battery, the battery pack comprising:

a computer that communicates with another computer disposed in a charging device and authenticates the charging device; and charging control means, controlled by the computer, for supplying a charging current to the secondary battery when the charging device has been successfully authenticated and shutting off the charging current when the charging device has not been successfully authenticated after the charging state has continued for a predetermined time period during which an authentication process is repeated at a plurality of intervals, wherein the computer of the battery pack and the other computer disposed in the charging device mutually authenticate each other according to a challenge and response system, the challenge and response system including a first step where first challenge data is transmitted from the charging device to the battery pack, and after the battery pack receives the first challenge data, the battery pack generates first response data including both secret information associated with the battery pack and the first challenge data, the battery pack transmits the first response data to the charging device, and if the first response data of the battery pack matches the first challenge data of the charging device, the computer disposed in the charging device determines that the battery pack is authentic and causes an authenticated result to be stored in the charging device, and a second step where second challenge data is transmitted from the battery pack to the charging device, and after the charging device receives the second challenge data, the charging device generates second response data including both the second challenge data received from the battery pack and secret information associated with the charging device, the charging device transmits the second response data to the battery pack, and if the second response data of the charging device matches the second challenge data of the battery pack, the computer disposed in the battery pack determines that the charging device is authentic and causes another authenticated result to be stored in the charging device, thereby completing the mutual authentication between the battery pack and the charging device, and wherein the computer of the battery pack and the other computer disposed in the charging device repeatedly authenticate each other at a predetermined cycle, and wherein the shutoff state of the charging current is cancelled when the battery pack is detached from the charging device.

2. The battery pack as set forth in claim 1,
wherein when the battery pack is attached to the charging device, the computer authenticates the charging device.

3. The battery pack as set forth in claim 1,
wherein the charging control means supplies a charging current to the secondary battery when the charging current of the battery pack is a predetermined value prior to the charging device being successfully authenticated.

4. A charging control method performed under control of a computer of a battery pack having a secondary battery and a circuit that controls charging and discharging of the secondary battery, the charging control method comprising:

communicating with another computer disposed in the charging device and authenticating the charging device; and supplying a charging current to the secondary battery when the charging device has been successfully authenticated and shutting off the charging current when the charging device has not been successfully authenticated after the charging state has continued for a predetermined time period during which an authentication process is repeated at a plurality of intervals, wherein the computer of the battery pack and the other computer disposed in the charging device mutually authenticate each other according to a challenge and response system, the challenge and response system including a first step where first challenge data is transmitted from the charging device to the battery pack, and after the battery pack receives the first challenge data, the battery pack generates first response data including both secret information associated with the battery pack and the first challenge data, the battery pack transmits the first response data to the charging device, and if the first response data of the battery pack matches the first challenge data of the charging device, the computer disposed in the charging device determines that the battery pack is authentic and causes an authenticated result to be stored in the charging device, and a second step where second challenge data is transmitted from the battery pack to the charging device, and after the charging device receives the second challenge data, the charging device generates second response data including both the second challenge data received from the battery pack and secret information associated with the charging device, the charging device transmits the second response data to the battery pack, and if the second response data of the charging device matches the second challenge data of the battery pack, the computer disposed in the battery pack determines that the charging device is authentic and causes another authenticated result to be stored in the charging device, thereby completing the mutual authentication between the battery pack and the charging device, and;

wherein the computer of the battery pack and the other computer disposed in the charging device repeatedly authenticate each other at a predetermined cycle, and wherein the shutoff state of the charging current is cancelled when the battery pack is detached from the charging device.

5. The charging control method as set forth in claim 4,
wherein when the battery pack is attached to the charging device, the authenticating step is performed.

6. The charging control method as set forth in claim 4,
wherein the charging control method further comprises determining whether the charging current of the battery pack is a predetermined value prior to authenticating the charging device.

7. An application device to which a battery pack is attached as a power supply, the application device comprising:

a second computer that communicates with a first computer disposed in the battery pack and authenticates the battery pack, wherein when the battery pack is charged with a power of an AC adaptor connected to the application device, the first computer controls charging of the battery pack so that when the battery pack has been successfully authenticated, the charging current is supplied to a secondary battery and when the battery pack has not been successfully authenticated, the charging current is shut off after the charging state has continued for a predetermined time period during which an authentication process is repeated at a plurality of intervals, wherein the second computer and the first computer mutually authenticate each other according to a challenge and response system, the challenge and response system including a first step where first challenge data is transmitted from the charging device to the battery pack, and after the battery pack receives the first challenge data, the battery pack generates first response data including both secret information associated with the battery pack and the first challenge data, the battery pack transmits the first response data to the charging device, and if the first response data of the battery pack matches the first challenge data of the charging device, the computer disposed in the charging device determines that the battery pack is authentic and causes an authenticated result to be stored in the charging device, and a second step where second challenge data is transmitted from the battery pack to the charging device, and after the charging device receives the second challenge data, the charging device generates second response data including both the second challenge data received from the battery pack and secret information associated with the charging device, the charging device transmits the second response data to the battery pack, and if the second response data of the charging device matches the second challenge data of the battery pack, the computer disposed in the battery pack determines that the charging device is authentic and causes another authenticated result to be stored in the charging device, thereby completing the mutual authentication between the battery pack and the charging device, and wherein the second computer and the first computer repeatedly authenticate each other at a predetermined cycle, and wherein the shutoff state of the charging current is canceled when the battery pack is detached from the charging device.

8. The application device as set forth in claim 7, wherein when the battery pack has not been successfully authenticated, the battery pack is prohibited from being used as a power supply.

9. The application device as set forth in claim 7, wherein the first computer controls charging of the battery pack so that a charging current is supplied to a secondary battery when the charging current is a predetermined value prior to the battery pack being successfully authenticated.

* * * * *

UNITED STATES PATENT AND TRADEMARK OFFICE
CERTIFICATE OF CORRECTION

| | | |
|---|---|---|
| PATENT NO. | : 7,619,386 B2 | Page 1 of 1 |
| APPLICATION NO. | : 11/290929 | |
| DATED | : November 17, 2009 | |
| INVENTOR(S) | : Taichi Sasaki et al. | |

It is certified that error appears in the above-identified patent and that said Letters Patent is hereby corrected as shown below:

Title Page item 73

Add "Sony Computer Entertainment Inc., Tokyo, Japan" as an Assignee.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,619,386 B2  Page 1 of 1
APPLICATION NO. : 11/290929
DATED : November 17, 2009
INVENTOR(S) : Taichi Sasaki et al.

It is certified that error appears in the above-identified patent and that said Letters Patent is hereby corrected as shown below:

ON THE TITLE PAGE ITEM 73:

Add "Sony Computer Entertainment Inc., Tokyo, Japan" as an Assignee.

Signed and Sealed this

Ninth Day of November, 2010

David J. Kappos
*Director of the United States Patent and Trademark Office*